United States Patent
Sancheti et al.

(10) Patent No.: US 7,383,370 B1
(45) Date of Patent: Jun. 3, 2008

(54) ARBITER CIRCUIT AND SIGNAL ARBITRATION METHOD

(75) Inventors: Sanjay Sancheti, Sunnyvale, CA (US); Gareth Feighery, San Mateo, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 102 days.

(21) Appl. No.: 11/384,748

(22) Filed: Mar. 20, 2006

Related U.S. Application Data

(60) Provisional application No. 60/666,983, filed on Mar. 31, 2005.

(51) Int. Cl.
*G06F 13/00* (2006.01)

(52) U.S. Cl. .................. 710/241; 326/94; 327/19

(58) Field of Classification Search ............. 710/241; 326/94; 327/19
See application file for complete search history.

(56) References Cited

U.S. PATENT DOCUMENTS

| | | | |
|---|---|---|---|
| 4,398,105 A | 8/1983 | Keller | |
| 4,620,118 A | 10/1986 | Barber | |
| 4,757,217 A | 7/1988 | Sawada et al. | |
| 4,841,178 A | 6/1989 | Bisson | |
| 4,998,027 A | 3/1991 | Mihara et al. | |
| 5,138,189 A | 8/1992 | Leung et al. | |
| 5,398,211 A | 3/1995 | Willenz et al. | |
| 6,018,785 A | 1/2000 | Wenniger | |
| 6,498,513 B1 * | 12/2002 | Reynolds | 326/94 |
| 6,625,711 B1 | 9/2003 | Raza et al. | |
| 6,674,306 B1 | 1/2004 | Reynolds | |
| 6,715,021 B1 | 3/2004 | Paul et al. | |
| 6,781,418 B1 | 8/2004 | Reynolds | |
| 6,816,955 B1 | 11/2004 | Raza et al. | |
| 6,816,979 B1 | 11/2004 | Chen et al. | |
| 6,853,218 B1 | 2/2005 | Reynolds | |
| 6,906,566 B2 | 6/2005 | Drexler | |
| 6,919,735 B2 | 7/2005 | Porter et al. | |
| 7,039,824 B2 | 5/2006 | Simon et al. | |
| 7,225,283 B1 * | 5/2007 | Nayak et al. | 710/241 |
| 2002/0166003 A1 * | 11/2002 | Nystrom et al. | 710/18 |

* cited by examiner

*Primary Examiner*—Glenn A. Auve
(74) *Attorney, Agent, or Firm*—Haverstock & Owens, LLP

(57) ABSTRACT

An arbiter circuit (100) can include a latch circuit (102) that latches competing input signals (MATCH1 and MATCH2) to generate signals on latch output (110-0 and 110-1). A filter section (104) can prevent metastable states of latch output signals from propagating through to output signals (BUSY2 and BUSY1). In addition, filter section (104) can generate output signals (BUSY2 and BUSY1) having one set of values when both inputs are inactive, and a second set of values when latch (102) is in the metastable state.

20 Claims, 4 Drawing Sheets

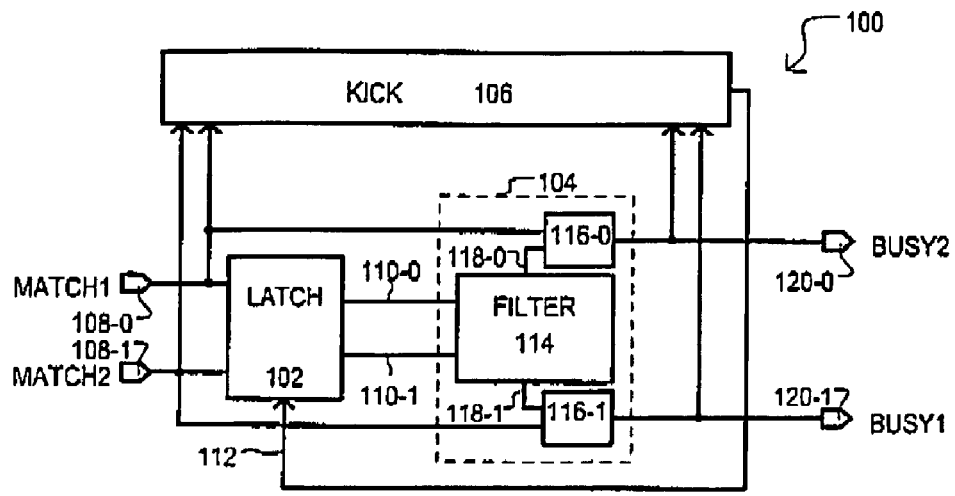
FIG. 1
| MATCHL | MATCHR | BUSYBL | BUSYBR | DESCRIPTION |
|---|---|---|---|---|
| 0 | 0 | 1 | 1 | No address match. Both ports BUSYBR/BUSYBL are inactive. Both ports are granted access. |
| 0 | 1 | 0 | 1 | Left port lost. Right port wins and is granted access. |
| 1 | 0 | 1 | 0 | Right port lost. Left port wins and is granted access. |
| 1 | 1 | 0 | 0 | Metastable state. Both ports are indicated as busy. (Kicker circuit will resolve metastable state after delay). |
FIG. 3
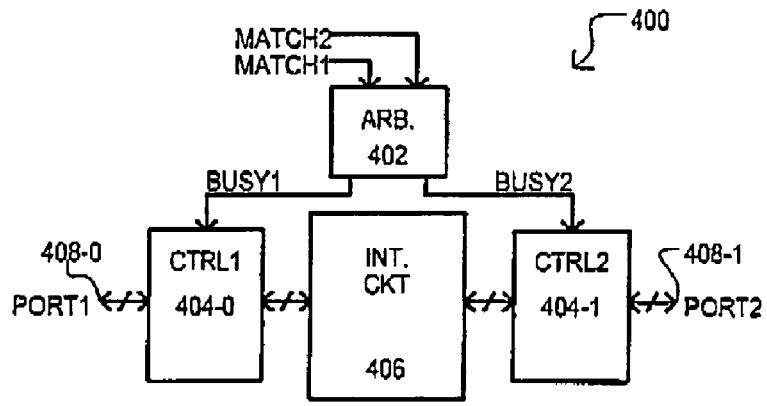
FIG. 4

ARBITER CIRCUIT AND SIGNAL ARBITRATION METHOD

This application claims the benefit of U.S. provisional patent application Ser. No. 60/666,983, filed Mar. 31, 2005.

TECHNICAL FIELD

The present invention relates generally to electronic circuits, and more particularly to arbiter circuits that can resolve conflicts between competing accesses to a same location of a device.

BACKGROUND OF THE INVENTION

Arbiter circuits can resolve (e.g., arbitrate) conflicts between two signals that can be activated essentially simultaneously. Arbiters can play an important role in devices such as dual port random access memories (RAMs) by arbitrating accesses to a same storage circuit via different ports. Arbiters generally have two "request" inputs and two "grant" outputs and resolve conflicts between two conflicting simultaneously received or asserted inputs.

A drawback to conventional asynchronous arbiters can be the presence of metastability conditions. A metastability condition can result from two simultaneously asserted inputs that result in both outputs being either high or at an approximately equal intermediate voltage level. A metastability condition can increase a resolution time by an indefinite amount. Consequently, timing cannot be guaranteed for cases where an arbiter circuit is susceptible to a metastable state.

To better understand various aspects of the embodiments, conventional arbiter circuits will now be described. A first conventional asynchronous arbiter is set forth in FIG. 5, and designated by the general reference character 500.

A first conventional arbiter circuit 500 can include a latch 502 and output logic 504. A drawback to such an arrangement can be that gates within latch 502 and output logic 504 can be trip point dependent. That is, assuming arbiter circuit 500 is formed from complementary metal-oxide-semiconductor (CMOS) devices, the point at which different values are latched within latch 502 can depend upon the threshold voltage of p-channel field effect transistors (PFETs) and n-channel FETs (NFETs) forming such circuits. At lower power supply voltages, the sum of PFET and NFET threshold voltages can exceed a minimum supply voltage. This can produce a region of uncertainty in operation, in which the latch 502 can enter an indeterminate (metastable) state. While gate sizes can be sized to skew a trip point, such approach may not be capable of ensuring operation over all anticipated operating conditions, including a range of power supply voltages, operating temperatures, as well as manufacturing process induced variations.

A second conventional solution 600 shown in FIG. 6 comprises a latch 602, a filter circuit 604, and a kicker circuit 606. A latch 602 can latch data values according to input signals MATCHR and MATCHL. A filter circuit 604 can help eliminate metastable states by including "always on" PFETs that can force arbiter outputs to predetermined levels absent a stable latching by latch 602. In addition, a kicker circuit 606 can force latch 602 into a given state after a predetermined delay in the event both inputs are driven high (potentially metastable inducing inputs).

A drawback to the arrangement of FIG. 6 can be that arbiter outputs BUSYBL and BUSYBR can be the same in a no address match state (both inputs low) and a metastable state (both inputs high, introducing metastability).

BRIEF DESCRIPTION OF THE DRAWINGS

FIG. 1 is a block schematic diagram of a first embodiment.

FIG. 3 is a table showing the operation of the second embodiment.

FIG. 4 is a block schematic diagram of a third embodiment.

DETAILED DESCRIPTION

Figure 2:
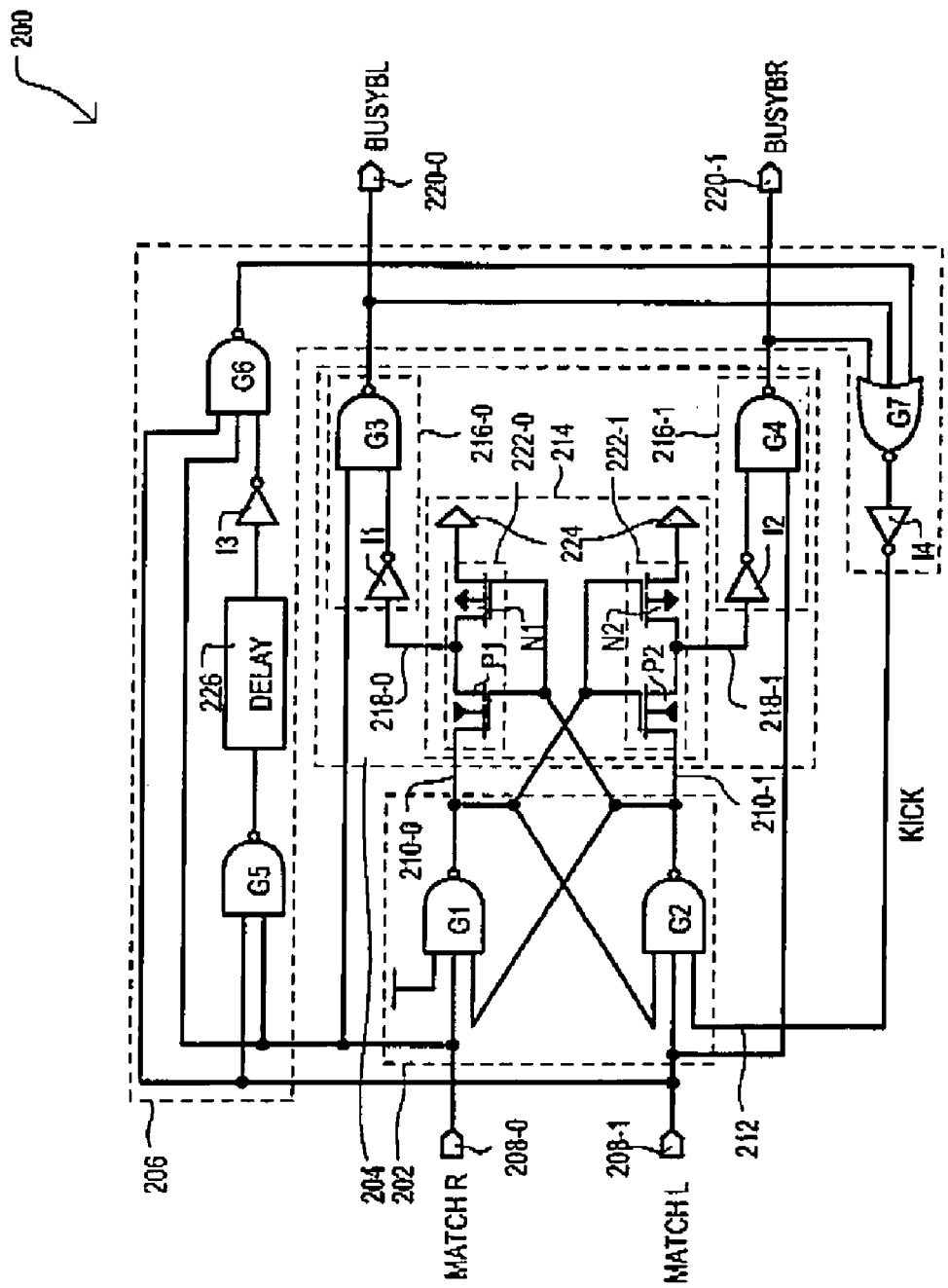
FIG. 2 is a schematic diagram of a second embodiment.
Figure 5:
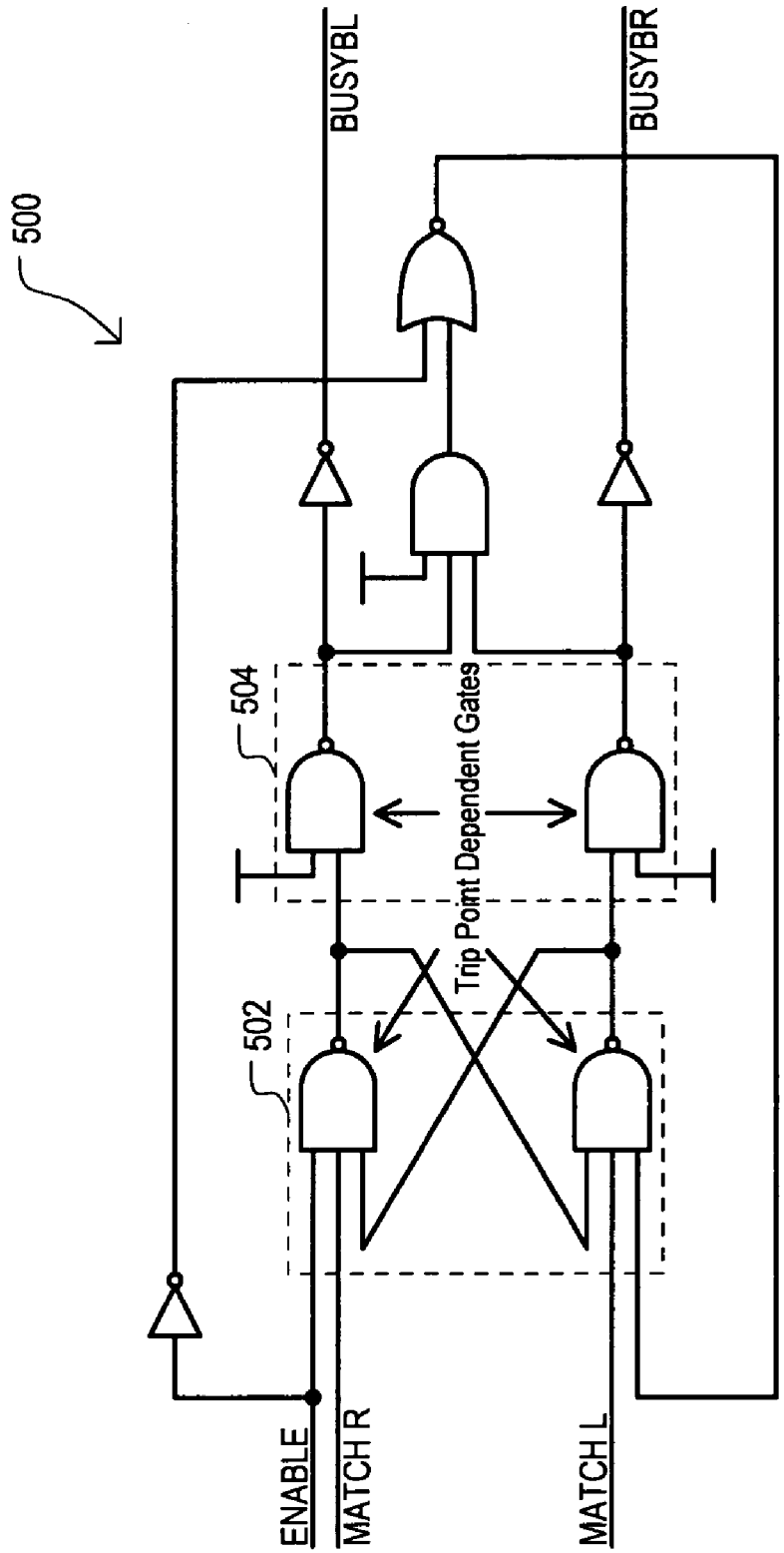
FIG. 5 is a schematic diagram of a first conventional arbiter circuit.
Figure 6:
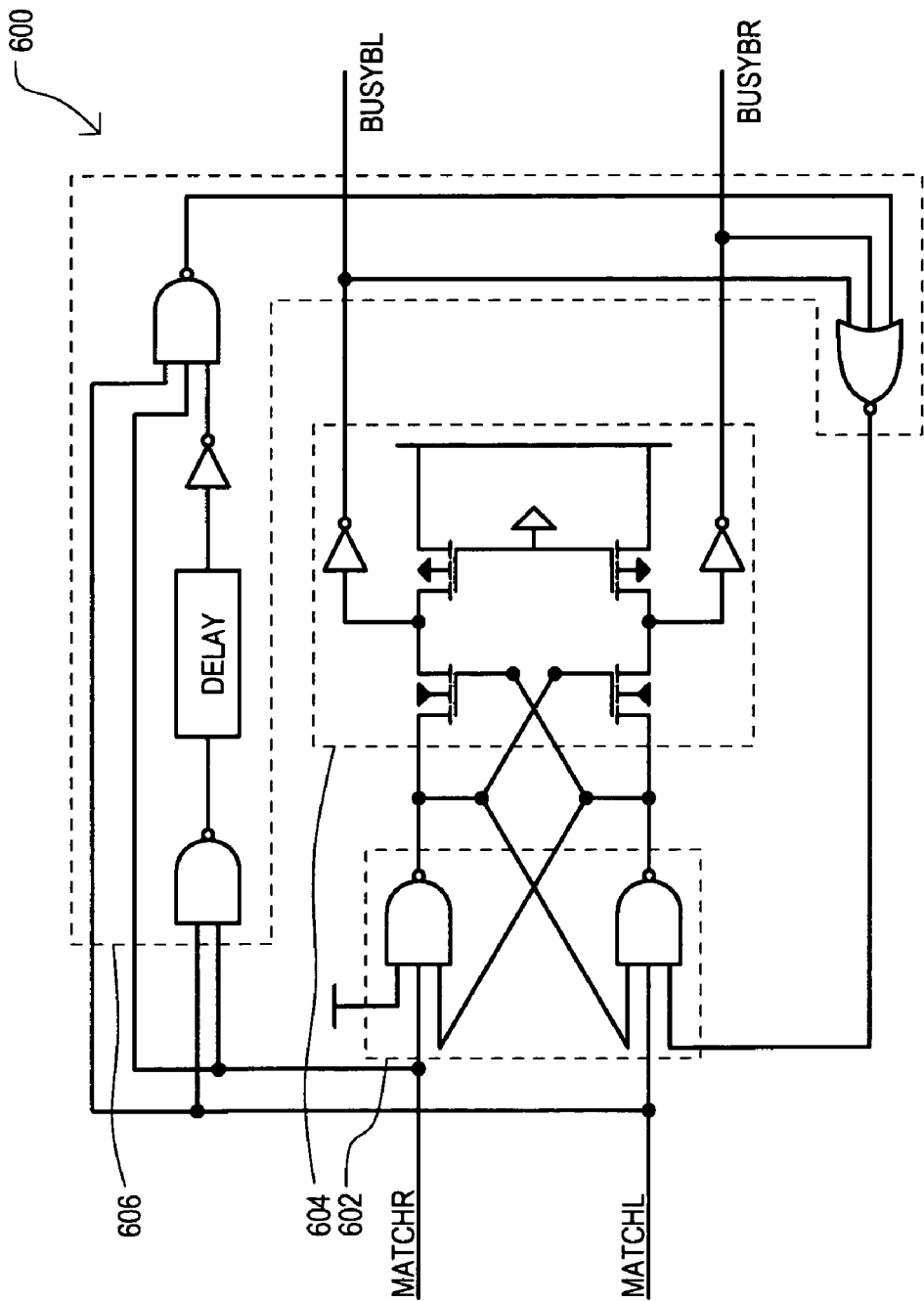
FIG. 6 is a schematic diagram of a second conventional arbiter circuit.

The present invention is directed to an arbiter circuit that can resolve conflicts between competing accesses to a same location of a device. For example, the disclosed embodiments can resolve competing ports of a random access memory (RAM).

Referring now to FIG. 1, an arbiter circuit according to a first embodiment is shown in block diagram and designated by the general reference character 100. An arbiter circuit 100 can include a latch circuit 102, a filter section 104, and a kicker section 106. In the embodiment of FIG. 1, filter section 104 can be a "metastability" filter that can reduce or eliminate complementary transistor threshold trip point dependence on operations. Further, the arbiter circuit can distinguish between a no match case (both inputs inactive—no possible contention), and a metastable state (both inputs active, essentially simultaneously, creating contention).

In the example of FIG. 1, a latch circuit 102 can receive input signals MATCH1 and MATCH2 at signal inputs 108-0 and 108-1, respectively. In response to such signals, latch circuit 102 can provides signals on latch outputs 110-0 and 110-1. Provided input signals MATCH1 and MATCH2 transition between different values with sufficient delay in between, latch circuit 102 can latch complementary values at latch outputs 110-0 and 110-1. However, if both inputs transition to a same value, a latch circuit 102 can enter a metastable state that may not resolve contention between input signals. To address potentially metastable states, a latch circuit 102 can be forced to a predetermined state, favoring one signal over the other, in response to a kick signal KICK received on feedback line 112.

A filter section 104 can receive latch outputs (110-0 and 110-1) as well as input signals at input nodes (108-0 and 108-1). The filter section 104 of FIG. 1 can include a filter circuit 114, first filter output logic 116-0, and second filter output logic 116-1. Filter circuit 114 can operate to drive filter outputs 118-0 and 118-1 to predetermined levels even in the presence of metastable output values from latch circuit 102.

Referring still to FIG. 1, first filter output logic 116-0 can logically combine an input signal received at input signal node 108-0 with filter output 118-0 to generate an output signal BUSY2 on an output node 120-0. In a similar fashion, second filter output logic 116-1 can logically combine an input signal received at input signal node 108-1 with filter output 118-1 to generate an output signal BUSY1 on a second output node 120-1. Such an arrangement can enable output values BUSY1 and BUSY2 to be driven to different levels in response to a no match state (MATCH1 and MATCH2 both inactive) versus a contention state (MATCH1 and MATCH2 both in active).

Still further, because each filter output logic (116-0 and 116-1) directly receives input signals MATCH1 and MATCH2, output signals can be disabled/enabled rapidly when input states change.

A kicker section 106 can resolve potential metastable states within latch circuit 102. In FIG. 1, kicker section 106 can receive input signals at nodes 108-0 and 108-1, as well as output signals on output nodes 120-0 and 120-1. If such signals indicate a metastable state, kicker section 106 can activate kick signal KICK, and thus force latch circuit 102 in to a stable state. Preferably, a signal KICK can be activated some predetermined delay after a latch enters a metastable state.

Referring now to FIG. 2, a second embodiment of the present invention is shown in a block schematic diagram and designated by the general reference character 200. Arbiter circuit 200 can include the same general portions as that of the first embodiment of FIG. 1. Accordingly, like portions will be referred to by the same reference character but with the first digit being a "2" instead of a "1".

In the embodiment of FIG. 2, a latch circuit 202 can include three-input NAND gates G1 and G2, configured in a cross-coupled manner. That is, gate G1 can have one input connected to input node 208-0, another input connected to the output of gate G2, and a third input connected to a high power supply voltage. Gate G2 can have an input connected to input 208-1, another input connected to the output of gate G1, and a third input that receives a signal KICK. In such an arrangement, gate G1 can operate as a two input NAND gate, while gate G2 can serve as a metastable state resolver if both input signals MATCHR and MATCHL are active (high, in this example). In particular, in response to a high KICK signal, latch circuit 202 can force latch output 210-0 high and latch output 210-1 low.

In this way, a latch circuit 202 can latch a value determined by two input signals MATCHR and MATCHL, and be automatically forced into a predetermined state in the event of a potentially metastable state.

Within a filter section 204, a filter circuit 214 can be conceptualized as including a first side 222-0 and a second side 222-1. A first side 222-0 can include a transistor of a first conductivity type P1 and a transistor of a second conductivity type N1. In the particular example of FIG. 2, transistor P1 can include a p-channel insulated gate field effect transistor (PFET) having a source-drain path connected between a first latch output 210-0 and first filter output 218-0, and a gate connected to a second latch output 210-1. Transistor N1 can include an n-channel FET (NFET) having a source-drain path connected between first filter output 218-0 and a low power supply node 224, and a gate connected to a second latch output 210-1.

A second side 222-1 of filter circuit 214 can have a mirror type arrangement with respect to the first side 222-0, including a transistor of a first conductivity type P2 and a second conductivity type N2. In the particular example of FIG. 2, transistor P2 can include a PFET having a source-drain path connected between a second latch output 210-1 and second filter output 218-1, and a gate connected to a first latch output 210-0. Transistor N2 can include an NFET having a source-drain path connected between a second filter output 218-1 and low power supply node 224, and gate connected to a first latch output 210-0.

Filter circuit 204 further includes first and second filter output logic 216-0 and 216-1. Such logic can generate output signals BUSYBL and BUSYBR based on both a received input signal, as well as a level at a filter output node (218-0 and 218-1). In FIG. 2, first filter output logic 216-0 can include an inverter I1 and a NAND gate G3. Inverter I1 can have an input connected to first filter output 218. Gate G3 can have a first input connected to input signal node 208-0, a second input connected to an output of inverter I1, and an output that provides output signal BUSYBL on output node 220-0. Second filter output logic 216-1 can include an inverter I2 and a NAND gate G4 connected to second filter output 218-1 and input signal node 208-1, in the same general fashion, to generate output signal BUSYBR on output node 220-1.

Referring still to FIG. 2, in a no match condition (i.e., MATCHR and MATCHL both low), inverters I1 and I2 can provide high outputs to the inputs of gates G3 and G4, respectively. However, because gates G3 and G4 also receive low input signals MATCHR and MATCHL, respectively, both output signals BUSYBL and BUSYBR will be driven high. This can enable access via two ports, for example, in such a no match case.

However, in a potentially metastable state, (i.e., MATCHR and MATCHL both high essentially simultaneously), inverters I1 and I2 may continue to provide high outputs to the inputs of gates G3 and G4, respectively. However, because gates G3 and G4 also receive high input signals MATCHR and MATCHL, respectively, both output signals BUSYBL and BUSYBR will be driven low. This can deny access via two ports, for example, until contention is resolved. Such output values can be maintained until kicker section 206 resolves the state by activating signal KICK.

In this way, different output values can be provided for a no match state, and a metastable state.

In addition, first and second filter output logic (216-0 and 216-1) can enable fast responses for certain transitions in arbiter circuit 200 state. In particular, assuming both signals are initially inactive (MATCHR and MATCHL both low), inverters I1 and I2 can output high levels. Thus, when either (or both) inputs signals transition high, the corresponding output signal will transition high after only a gate delay of gate G3 or G4. Along these same lines, output signals BUSYBL or BUSYBR can transition rapidly from active to inactive in response to a corresponding input signal MATCHR or MATCHL going from match state (active) to a no match state (inactive).

FIG. 3 shows a truth table explaining in detail the generation of output signals according to received input signals, for the very particular embodiment of FIG. 2.

Referring still to FIG. 2, in the embodiment shown, kicker section 206 can include a match logic gate G5, a delay circuit 226, an inverter I3, a state duration detect gate G6, a summing gate G7, and an output inverter I4. A match logic gate G5 can detect when both input signals MATCHR and MATCHL are simultaneously active. In the particular embodiment shown, match logic gate G5 can be a NAND gate having inputs connected to input signal nodes 208-0 and 208-1. A delay circuit 226 can delay an output from gate G5 to provide an input to inverter I3. State duration detect gate G6 can determine when inputs have been maintained at a contention state (both active) for a predetermined period of time. In FIG. 2, gate G6 can include a NAND gate having a first input connected to input node 208-1, a second input connected to node 208-0, and a third input connected to the output of inverter I3. In such an arrangement, if both inputs are active longer than the delay of delay circuit 226, gate G6 can drive an output from low to high.

Referring still to FIG. 2, summing gate G7 can determine if a metastable state exists, and correct such a state by activating kick signal KICK. In particular, summing gate G7 can determine if gate G6 has determined both inputs are active, and both outputs signals indicate a metastable state (BUSYBL and BUSYBL both low). In FIG. 2, summing gate G7 can include a NOR gate having a first input connected to output node 220-1, a second input connected to output node 220-0, and a third input connected to the output of gate G6. The output of gate G7 can be inverted by inverter I4 to generate kick signal KICK.

In this way, a metastable state can be resolved by activation of delayed kick signal.

Referring now to FIG. 4, a device according to a third embodiment is set forth in a block schematic diagram and designated by the general reference character 400. A device 400 can include an arbiter circuit 402, a first port controller 404-0, a second port controller 404-1, and an internal circuit 406. An arbiter circuit 402 can have a structure like any of the above embodiments or equivalents. Thus, arbiter circuit 402 can provide two output signals BUSY1 and BUSY2 according to contending input signals MATCH1 and MATCH2.

A first port controller 404-0 can enable accesses between a first port 408-0 and internal circuit 406 based on signal BUSY1. In the same general fashion, second port controller 404-1 can enable access between a second port 408-1 and internal circuit 406 based on signal BUSY2.

An internal circuit 406 can be accessed in a dual-port fashion by way of first and/or second port (408-0 and 408-1). Preferably, an internal circuit 406 can include a memory cell array having addressable locations. In addition, first and second port controllers (404-0 and 404-1) can be bi-directional controllers enabling read and write operations to internal circuit 406.

As understood from the descriptions of FIGS. 1 and 2, in a no contention state, input signals MATCH1 and MATCH2 will both inactive, thus signals BUSY1 and BUSY2 can both be inactive. Consequently, access via both ports 408-0 and 408-1 can be enabled. However, in a contention state (e.g., potentially metastable state), input signals MATCH1 and MATCH2 can both go active essentially simultaneously. In such a case, signals BUSY1 and BUSY2 can both be active, and thus access via either port 408-0 and 408-1 can be initially denied. Some delay after, access contention can be resolved by a kicker section, or the like, and one of ports (408-0 or 408-1) can be enabled.

Provided input signals transition between states when only one signal is active, one appropriate port with be granted access, while the other will be denied access.

The above embodiments can provide an arbiter circuit that can operate at relatively low operating voltages by inclusion of a filter circuit that can drive outputs in the presence of indeterminate latching levels. In addition, power consumption can be reduced, as a filter section may not include p-channel IGFETs arranged in an "always on" condition. Still further, output signals can be enabled/disabled rapidly, as corresponding input signals can be provided directly to filter output logic.

Of course, the above examples are but representative embodiments, and should not be construed as limiting the invention thereto. For example, a kicker can be used to favor either a first or second port. Further, a same logic function can be implemented with several using different logic gate configurations.

It is also understood that embodiments of the present invention can be well suited to performing various other steps or variations of the steps recited herein, and in a sequence other than that depicted and/or described herein.

For purposes of clarity, many of the details of the improved solution and the methods of designing and manufacturing the same that are widely known and are not relevant to the present invention have been omitted from the following description.

It is also understood that other embodiments of this invention may be practiced in the absence of an element/step not specifically disclosed herein.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. An arbiter circuit, comprising,
    a latch circuit that is coupled to receive a first input signal and a second inputs signal, each input signal having a match state and a no match state, the latch circuit being driven to a forced state in response to an active kick signal;
    a filter section coupled to the latch circuit, the filter section driving arbiter output values to a first set of values when the latch circuit is in a metastable state in response to the first and second input signals having the match state, and driving the arbiter output values to a second set of values in response to the first and second input signals having the no match state; and
    a kick signal generator, coupled to receive at least the first and second input signals, which activates' the kick signal after a predetermined delay in response to the first and second input signals having the match state.

2. The arbiter circuit of claim 1, wherein:
the latch circuit includes
    a first logic gate having one first gate input coupled to receive the first input signal, another first gate input, and a first gate output, and
    a second logic gate having one second gate input coupled to receive the second input signal, another second gate input coupled to the first gate output, and a second gate output coupled to the other first gate input.

3. The arbiter circuit of claim 1, wherein:
the latch circuit includes a first latch output and a second latch output; and
the filter section includes
a first transistor of a first conductivity type having a source-drain path coupled to the first latch output and a gate coupled to the second latch output,
a second transistor of the first conductivity type having a source-drain path coupled to the second latch output and a gate coupled to the first latch output,
a first filter logic gate having a first input coupled to receive the first input signal and a second input coupled to the source-drain path of the first transistor, and
a second filter logic gate having a first input coupled to receive the second input signal and a second input coupled to the source-drain path of the second transistor.

4. The arbiter circuit of claim 3, wherein:
the filter section includes
a third transistor of a second conductivity type having a source-drain path coupled between the source-drain path of the first transistor and a power supply node and a gate coupled to the second latch output, and
a fourth transistor of the second conductivity type having a source-drain path coupled between the source-drain path of the second transistor and the power supply node and a gate coupled to the first latch output.

5. The arbiter circuit of claim 4, wherein:
the first and second transistors are p-channel insulated gate field effect transistors (IGFETs), and
the third and fourth transistors are n-channel IGFETs.

6. The arbiter circuit of claim 1, wherein:
the kick signal generator includes
a kicker logic gate having at least a first kicker gate input coupled to receive the first input signal, a second kicker gate input coupled to receive the second input signal, and a kicker gate output, and
a delay circuit that delays the activation of the kick signal by a predetermined amount with respect to the first and second input signals.

7. The arbiter circuit of claim 6, wherein:
the kick signal generator further includes an output logic gate having a first input coupled to the output of the first kicker gate, a second input coupled to receive a first arbiter output value, a third input coupled to receive a second arbiter output value, and an output coupled to provide the kick signal to the latch circuit.

8. A method of arbitrating access between first and second ports of an integrated circuit device, comprising the steps of:
receiving first and second input signals having match and no match states;
providing first and second busy signals having active and inactive states;
in response to both first and second input signals having no match states, latching such a state and de-activating both a first and second busy signal; and
when an arbitrating latch is driven to an indeterminate state in response to the first and second input signals being driven to a match state, activating both the first and second busy signals, and after a predetermined delay, de-activating the second busy signal.

9. The method of claim 8, wherein:
granting access via the first port when the first busy signal is inactive and denying access via the first port when the first busy signal is active, and granting access via the second port when the second busy signal is inactive and denying access via the second port when the second busy signal is active.

10. The method of claim 8, wherein:
when a latch is driven to a first determinate state by the first input signal being driven to the no match state and the second input signal being driven to the match state, de-activating the first busy signal and activating the second busy signal; and
when a latch is driven to a second determinate state by the first input signal being driven to the match state and the second input signal being driven to the no match state, activating the first busy signal and de-activating the second busy signal.

11. The method of claim 8, wherein:
de-activating both the first and second busy signal includes
enabling a first filter insulated gate field effect transistor (IGFET) having a source-drain path coupled to a power supply node, and
enabling a second filter IGFET having a source-drain path coupled to the power supply node.

12. The method of claim 11, wherein:
the first and second IFGETs are n-channel IGEETs.

13. The method of claim 8, wherein:
the arbitrating latch comprises cross-coupled logic gates including a first latch logic gate having an input coupled to an output of a second logic gate having an input coupled to an output of the first logic gate;
activating both the first and second busy signal includes
enabling a third IGFET having a source-drain path coupled to the output of the first latch logic gate, and
enabling a fourth IGFET having a source-drain path coupled to the output of the second latch logic gate.

14. The method of claim 13, wherein:
the third and fourth IFGETs are p-channel IGFETs.

15. An arbiter circuit that arbitrates between activation of signals received at first and second input signal nodes, comprising:
a first latch logic gate having a first input coupled to a first input signal node, a second input coupled to the output of a second latch logic gate, and an output coupled to an input of the second latch logic gate; and
a filter circuit that includes
a first filter transistor having a source-drain path coupled between the output of the first latch logic gate and a first filter result node, and
a first filter output logic gate having a first input coupled to the first signal input node, a second input coupled to the first filter result node, and an output that provides a first arbitration output signal.

16. The arbiter circuit of claim 15, further including:
the first filter transistor comprises a p-channel insulated gate field effect transistor.

17. The arbiter circuit of claim 15, wherein:
the filter circuit further includes
a second filter transistor having a source-drain path coupled between the output of the second latch logic gate and a second filter result node, and
a second filter output logic gate having a first input coupled to the second signal input node, a second input coupled to the second filter result node, and a second arbitration output signal.

18. The arbiter circuit of claim 17, wherein:

the filter circuit further includes a third filter transistor having a source-drain path coupled between the first filter result node and a power supply node, and a gate coupled to the output of the second latch logic gate, and a fourth filter transistor having a source-drain path coupled between the second filter result node and the power supply node, and a gate coupled to the output of the first latch logic gate, wherein the first and second filter transistors are of a first conductivity type, and the third and fourth filter transistors are of a second conductivity type.

19. The arbiter circuit of claim 15, further including:

a kick circuit comprising a first kick logic circuit having a first input coupled to the first signal input node, a second input coupled to the second signal input node, and a delay circuit coupled to an output of the first kick logic circuit.

20. The arbiter circuit of claim 19, wherein:

the kick circuit further includes a kick signal output circuit having at least a first input coupled to an output of the first filter output logic gate and a second input coupled to an output of the kick circuit, and an output coupled to the second logic gate.

* * * * *

UNITED STATES PATENT AND TRADEMARK OFFICE
CERTIFICATE OF CORRECTION

| | |
|---|---|
| PATENT NO. | : 7,383,370 B1 |
| APPLICATION NO. | : 11/384748 |
| DATED | : June 3, 2008 |
| INVENTOR(S) | : Sanjay Sancheti and Gareth Feighery |

It is certified that error appears in the above-identified patent and that said Letters Patent is hereby corrected as shown below:

At column 2, line 39, please replace "provides" with -- provide -- so that the corresponding phrase reads -- circuit 102 can provide signals --.

At column 6, line 55, Claim 1, please replace "activates' the kick" with -- activates the kick -- so that the corresponding phrase reads -- which activates the kick signal --.

Signed and Sealed this

Sixteenth Day of September, 2008

JON W. DUDAS
*Director of the United States Patent and Trademark Office*